(12) United States Patent
Martin

(10) Patent No.: US 9,833,982 B2
(45) Date of Patent: Dec. 5, 2017

(54) HIGH PRESSURE DECORATIVE LAMINATE AND METHOD FOR MANUFACTURING THE SAME

(71) Applicant: Jeffrey Martin, Summerville, SC (US)

(72) Inventor: Jeffrey Martin, Summerville, SC (US)

(*) Notice: Subject to any disclaimer, the term of this patent is extended or adjusted under 35 U.S.C. 154(b) by 0 days.

(21) Appl. No.: 14/697,613

(22) Filed: Apr. 27, 2015

(65) Prior Publication Data

US 2017/0113447 A1 Apr. 27, 2017

Related U.S. Application Data

(60) Provisional application No. 61/998,210, filed on Jun. 23, 2014.

(51) Int. Cl.
| | |
|---|---|
| *B32B 37/14* | (2006.01) |
| *B32B 29/00* | (2006.01) |
| *B32B 7/10* | (2006.01) |
| *B32B 38/08* | (2006.01) |
| *B32B 37/26* | (2006.01) |

(52) U.S. Cl.
CPC ............ *B32B 37/144* (2013.01); *B32B 7/10* (2013.01); *B32B 29/005* (2013.01); *B32B 38/08* (2013.01); *B32B 2037/268* (2013.01); *B32B 2260/028* (2013.01); *B32B 2260/046* (2013.01); *B32B 2311/30* (2013.01); *B32B 2317/122* (2013.01); *B32B 2451/00* (2013.01)

(58) Field of Classification Search
CPC ....... B32B 37/144; B32B 7/10; B32B 29/005; B32B 38/08; B32B 2037/268; B32B 2260/028; B32B 2260/046; B32B 2311/30; B32B 2317/122; B32B 2451/00

USPC ...................................................... 428/537.5
See application file for complete search history.

(56) References Cited

U.S. PATENT DOCUMENTS

| | | | | | |
|---|---|---|---|---|---|
| 4,158,712 | A | * | 6/1979 | Degens | B32B 38/08 156/278 |
| 4,231,318 | A | * | 11/1980 | Zink | B05C 1/0834 118/122 |
| 4,354,449 | A | * | 10/1982 | Zink | B05C 1/0834 101/169 |
| 4,391,833 | A | * | 7/1983 | Self | B65D 81/3446 148/DIG. 85 |
| 4,473,613 | A | * | 9/1984 | Jaisle | B32B 29/06 156/307.1 |
| 6,896,971 | B2 | * | 5/2005 | Williams | B32B 37/0038 156/278 |

* cited by examiner

*Primary Examiner* — Leszek Kilman
(74) *Attorney, Agent, or Firm* — Terry B. McDaniel

(57) ABSTRACT

A method and a process for the production of high pressure laminate is disclosed using conventional manufacturing equipment without the use of melamine-formaldehyde resin pre-impregnated decorative print, solid, or overlay papers or combinations thereof. The method and process of making the disclosed laminate product utilize the assembly of a plurality of pre-impregnated Kraft papers independently saturated with melamine-formaldehyde resin, phenol-formaldehyde resin, and/or a bilayer coated construction of Kraft paper simultaneously containing both resins on opposing surfaces. The resulting pre-impregnated Kraft based components are assembled into the core layer and combined with the desired decorative layer assembly composed of untreated decorative print, solid, and/or overlay papers, or combinations thereof, prior to consolidation into a finished laminate using standard heat and pressure commonly known to those skilled in the art.

34 Claims, 7 Drawing Sheets

Figure 1

| STEEL PLATE |
|---|
| NON- TREATED OVERLAY PAPER |
| NON- TREATED DECORATIVE PRINT PAPER |
| MELAMINE-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 2

| STEEL PLATE |
|---|
| NON- TREATED OVERLAY PAPER |
| NON- TREATED DECORATIVE PRINT PAPER |
| MELAMINE-FORMALDEHYDE/PHENOL-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 3

| STEEL PLATE |
|---|
| NON-TREATED OVERLAY PAPER |
| NON-TREATED DECORATIVE SOLID PAPER |
| MELAMINE-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 4

| STEEL PLATE |
|---|
| NON- TREATED OVERLAY PAPER |
| NON- TREATED DECORATIVE SOLID PAPER |
| MELAMINE-FORMALDEHYDE/PHENOL-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 5

| STEEL PLATE |
|---|
| NON-TREATED DECORATIVE PRINT PAPER |
| MELAMINE-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 6

| STEEL PLATE |
|---|
| NON-TREATED DECORATIVE PRINT PAPER |
| MELAMINE-FORMALDEHYDE/PHENOL-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 7

| STEEL PLATE |
|---|
| NON-TREATED DECORATIVE SOLID PAPER |
| MELAMINE-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 8

| STEEL PLATE |
|---|
| NON-TREATED DECORATIVE SOLID PAPER |
| MELAMINE-FORMALDEHYDE/PHENOL-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 9

| STEEL PLATE |
|---|
| NON-TREATED OVERLAY PAPER |
| MELAMINE-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

Figure 10

| STEEL PLATE |
|---|
| NON-TREATED OVERLAY PAPER |
| MELAMINE-FORMALDEHYDE/PHENOL-FORMALDEHYDE IMPREGNATED KRAFT PAPER |
| PHENOL-FORMALDEHYDE IMPREGNATED KRAFT PAPER |
| PHENOL-FORMALDEHYDE IMPREGNATED KRAFT PAPER |
| RELEASE SHEET |

HIGH PRESSURE DECORATIVE LAMINATE AND METHOD FOR MANUFACTURING THE SAME

CROSS-REFERENCE TO RELATED APPLICATIONS

The instant application claims the benefit of previously filed Provisional Application No. 61/998,210 filed in the US Patent and Trademark Office on Jun. 23, 2014.

BACKGROUND

1. Field of the Invention

This invention relates to the preparation, assembly, and consolidation of pre-impregnated, fibrous sheets commonly referred to as a web, for the purpose of producing a laminated composite. In particular, this method is suitable for, however not limited to, producing high pressure decorative laminate (HPDL) without the need to pre-impregnate the decorative print, solid, or overlay papers or combinations thereof used in the manufacture of conventional HPDL. This process substantially simplifies the traditional manufacture of HPDL while creating resin flow dynamics that improve the performance of the resulting decorative surface. Although the processes and methods described herein can be adjusted to accommodate the faster cycles times associated with conventional low pressure or continuous pressing manufacturing processes and methods, for the sake of simplicity, the disclosure herein will focus on HPDL. This is in no way to be interpreted as limiting the scope of this invention to HPDL manufacturing processes only.

2. Description of the Prior Art

Laminates are constructed by the consolidation of layered materials into a unitary structure through the use of binding resin systems under heat and pressure. The layered materials traditionally consist of paper or woven fabrics that are readily available in roll form. These rolls are pre-impregnated with binders composed predominately of phenol-formaldehyde and/or melamine-formaldehyde thermosetting resins. After drying, the rolls are sheeted and the resulting materials are assembled using the desired layer structure. The entire mass is cured using heat and pressure to form a rigid panel that is utilized for its mechanical, electrical, chemical, and/or aesthetic properties.

High pressure decorative laminates are a specific subset of laminates that have found wide application as surfacing materials where the aesthetic value of the laminate surface as well as the laminate physical performance and mechanical performance are important. Initially however, as a consequence of their lower cost and superior performance, high pressure laminates were found only in industrial applications such as, replacing mica in electrical insulation materials or shortly thereafter, as the base material used to form automotive timing gears.

Finally, in 1927, Formica Corporation developed the barrier sheet that provided the core layer for rotogravure printed papers to make decorative wood-grained or marble-surfaced laminates, this technological development gave birth to what is now viewed as the ancestor of the modern decorative laminate. The technological development of creating dimensionably stable planar materials and decorative laminates more or less tracks the history of improvements disclosed in the following US patents: U.S. Pat. No. 3,620,899 to Kelly et al., November 1971; U.S. Pat. No. 3,716,396 to Shirano et al., February 1973; U.S. Pat. No. 3,900,690 to Schwarz, August 1975; U.S. Pat. No. 4,158,712 to Degens, June 1979; U.S. Pat. No. 4,231,318 to Zink, November 1980; U.S. Pat. No. 4,354,449 to Zink, October 1982; U.S. Pat. No. 4,391,833 to Self et al., July 1983; and U.S. Pat. No. 4,473,613 to Jaisle et al., September 1984, each of which teachings is considered as incorporated herein.

In the modern decorative laminates, texture, color, and pattern are used by the designer to recreate the look of natural materials or create an entirely new look. The designer incorporates the aesthetic character of the surface into the laminate and the construction and composition of the laminate act to preserve the aesthetic character in the harsh environment typical of most decorative laminate applications. Herein rests the market place value of laminates—their ability to preserve the original image, texture, and quality of the decorative surface under conditions that would quickly destroy their competitive alternatives or require expensive refinishing operations to retain the aesthetic value of the competitive surface. In addition, the almost unlimited combinations of color, texture, and pattern provide the designer with complete freedom to organize fresh visual and tactile combinations that engage the viewer's senses in more intimate ways and preserve these elements in a medium that is extremely robust. Historically, decorative laminates, especially those replicating natural materials, have appeared "flat" or "plastic like" absent the depth that is demonstrated by most natural materials. However, by coupling the advances realized in the printing industry with high fidelity digital image reproduction and the new sophistication available in the plate engraving industry, laminates have become such excellent counterfeits to natural materials that often only the experienced eye under extremely close inspection can discriminate them from their natural counterparts. Many of the most significant advances in the manufacturing of decorative laminates have been the result of process improvements that allow for the multilayered structures required of laminate construction to be assembled with increasing efficiency while improving the physical and mechanical performance of the laminate that inculcates the visual and tactile combinations mentioned above. Many of these improvements have resulted in a reduction in the materials required to make laminate on a per square foot basis.

The process for manufacturing a decorative laminate can be broken down into four distinct steps—impregnation, assembly (or collation), pressing, and finishing. In practice, a high pressure decorative laminate consists of a core layer composed of from 2 to 5 sheets of Kraft paper weighing from approximately 160 grams per square meter to 380 grams per square meter (gsm). This Kraft paper is impregnated with a solvent or water based phenol-formaldehyde resin system. The resin impregnated Kraft paper is air dried in an oven heated to about 175° C. and b-staged to final resin content of about 30 wt % with a volatile content of about 7.5 wt %. After treating, the b-staged Kraft paper can be sheeted directly, or rewound into roll form where it will be cut into sheets at a later date and assembled as the core layer of the finished laminate prior to the pressing operation. The final treating specifications for the Kraft paper play an important role in the effective consolidation of the core layers that define the mechanical integrity of the finished laminate.

In addition, overlay paper composed of highly refined alpha cellulose with a basis weight in the range of 5-66 gsm is impregnated with a water based melamine-formaldehyde resin system. The resin impregnated overlay paper is air dried in an oven heated at a temperature similar to that discussed for the impregnated Kraft paper and b-staged to final resin content of about 80 wt % with a volatile content of about 7.0 wt %. After treating, the b-staged paper can be sheeted directly, or rewound into roll form where it will be cut into sheets at a later date and assembled as a component of the decorative layer of the finished laminate prior to the pressing operation. Since the resin impregnated overlay paper is utilized as the surface layer in the finished laminate, there are stringent chemical, physical, and mechanical performance requirements that must be achieved in this layer by design. Melamine-formaldehyde resin systems are color fast, chemically resistant, and form hard surfaces when fully cured; all important properties to consider when constructing materials to withstand the abuse common to decorative laminates in field installations. In addition, the refractive index of cured melamine resin is very close to that of alpha cellulose fiber, this makes for an optically clear, protective layer through which the aesthetic value of the decorative paper can be viewed. Often the abrasion resistance of the protective layer is increased though the incorporation of aluminum oxide particles. These particles can be incorporated during the overlay paper making process or during the treating operation conducted to resin impregnate the overlay paper. As already mentioned during the treated Kraft paper discussion, the final treating specifications for the overlay paper play an equally important role in the effective consolidation of the resulting protective layer to the decorative paper as well as strongly influence the level of void formation and surface performance realized in the finished laminate.

The visual character of the finished laminate is uniquely defined by the use of a decorative paper. The decorative paper can be a traditional pigmented solid, printed solid or conventional print paper. In all cases, the paper is of high quality and has a basis weight in the range of 48-154 gsm with traditional solid papers residing at the higher end of the range and the printed papers residing at the lower end of the range. The decorative papers at the high end of the basis weight range, particularly the traditional solid papers, are typically impregnated with melamine-formaldehyde resin in a single stage treating operation, or undergo a multi-stage treating operation that includes pre-impregnation using urea-formaldehyde resin followed by a top coat of melamine-formaldehyde resin to reduce the overall product cost. The use of a urea-formaldehyde resin two stage pre-impregnation is an extremely common practice in the manufacture of low pressure laminates. These treated solid papers are typically incorporated into the laminate without the use of a treated overlay. Conventional print papers and printed solids are typically incorporated into the laminate without prior resin impregnation and always utilize a treated overlay as the top layer in the finished laminate.

With the basic treated raw materials required for laminate manufacture prepared, all is ready to move forward with a typical assembly operation. This operation can be accomplished in manual fashion with the sheeted goods being hand assembled at a lay-up station, or through the use of industrial scale collators that simultaneously interleave and sheet rolls of paper onto pallets that are ready for delivery to the press. Using the standard practice for assembling a laminate construction with reference from the backside of the laminate and working toward the decorative face, the laminate assembly is composed of a plurality of resin impregnated Kraft sheets, upon which lies a decorative sheet paired with its protective treated overlay resin on the print surface. This assembly constitutes what will become a single consolidated laminate and is paired with its assembled mirror image separated by a release sheet to form what is commonly referred to as a "set." The incorporation of the release sheet prevents the consolidation of both laminates into a single double-face, unitary structure during pressing and facilitates the back-to-back release of the laminates reducing breakage at the press. The "set" is placed between two steel plates that impart the surface finish on the laminate and is cured to its final stage by heating the assembly to approximately 120-160° C. under 1000-1500 psi for about 15-25 minutes. The actual press cycle including the heat up and cool down periods are in the range or 30-75 minutes. Exposing the laminate assembly to these pressures and temperatures causes the resin contained within the impregnated sheets to flow between adjacent sheets, cure, and consolidate the laminate assembly into a unitary structure commonly referred to one skilled in the art as a high pressure decorative laminate or HPDL. There are a significant number of variations of the above mentioned process common to one skilled in the art of manufacturing HPDL. Specifically, in the operations that are designed to impart special effects in texture, appearance, and physical and mechanical performance, such as the use of foils or films to impart unique textures, the use of specific curing cycles to enhance the formable nature of the finished laminate at various temperatures, or the use of hard coated plate technology to aide in the production of abrasion/scratch resistant laminate surfaces (FIGS. 1-4).

In addition to the manufacture of HPDL, there are alternative processes utilized to manufacture low pressure decorative laminates, and in recent years have become a significant competitive threat to HPDL. The nature of this competitive threat is related to pressure that exists in the market place to provide surfacing materials at a lower cost, as well as more sophisticated coating technology with the ability to deliver a certain level of improved performance using the lower cost format typical of low pressure decorative laminates. In response to this competitive threat, the manufactures of HPDL have focused their innovation in areas that have provided for the use of lower cost materials such as recycled papers and blended resin systems, lower cost processes such as incorporating automation into the assembly operations, and lower cost laminate assemblies such as integrating more untreated paper into the final laminate assembly. A particularly notable example of this type of innovation is described in U.S. Pat. No. 6,896,971 to Williams et. al., which discloses a system and method that provides for coating two sides of a laminate material in such a way that one side is coated with one substance and the other side is coated with a different substance. Specifically, in segregating the melamine-formaldehyde resin coating and the phenol-formaldehyde resin coating to different sides of the same laminate material, the quantity of materials required to construct a laminate assembly can be reduced, the process for manufacturing the finished laminate can be simplified, and the resulting improvement in material and operational efficiency reduces waste and lowers the manufacturing cost for goods sold. This innovation provided a revolutionary step for simplifying the manufacturing process required to product the Kraft core layer integral to HPDL performance.

Additionally, one skilled in the art of high pressure decorative laminate manufacturing is aware of the process described above where the treated overlay is used as the melamine-formaldehyde resin carrier for the entire decorative layer of the assembled laminate. Although this innovation is quite old and commonly utilized throughout the HPDL industry, it continues to play an important role in reducing cost of goods sold by eliminating the need to treat and inventory the very expensive decorative paper used to construct much of the high pressure decorative laminate sold into the market place today. However, as the image fidelity of printed papers continues to improve, and the sophistication of the coating technologies used by the low pressure decorative laminate manufacturers to deliver higher surface performance in the absence of an treated overlay protective layer, the burden of providing adequate surface protection with maximum transparency has forced the HPDL industry to significantly reduce the basis weight of the overlay paper utilized. These reductions in overlay basis weight have resulted in a fragile raw material that is a challenge to impregnate with resin, to handle after impregnation, and to process efficiently. As a result, impregnated overlay is a source of significant waste in the HPDL manufacturing process. The invention described herein, offers a revolutionary change in the process of manufacturing high pressure laminate and a novel solution to address the issues associated with incorporating extremely low basis weight overlays as a component of the laminate protective layer constructed using a melamine-formaldehyde resin impregnated fiber matrix or to eliminate impregnated overlays from the HPDL manufacturing process altogether.

Deeply embedded in the process of manufacturing HPDL is the idea that there are two separate and distinct processes for impregnating and assembling the materials that perform the decorative function of the laminate from those materials that perform the core function of the laminate and that these processes must remain separated. This concept is rooted in the developmental history of decorative laminate manufacturing and in the visual performance requirements of the decorative layer, which must maintain the color fastness inherent to the properties of cured melamine-formaldehyde resins. As a consequence of these manufacturing assumptions, processes and manufacturing plants are designed to avoid any potential for contamination of the melamine-formaldehyde resin layer, or the components thereof, with the readily oxidizable phenol-formaldehyde resin system. If phenolic contamination of the decorative surface or decorative components occur it will certainly result in strong color variations within the finished laminate that result when the phenolic contaminate turns dark brown upon oxidation. It is for this reason that all high pressure laminate manufacturing facilities typically have spatially distinct manufacturing areas within the plant where the preparation of phenolic based core and components materials are restricted from the preparation of melamine based decorative and component materials. By design, the material flow through the laminate manufacturing facility is routed in such a way that the decorative and core materials flow separately through the plant only to meet up at the press where they are subjected to the final assembly immediately prior to positioning in the press. The path of this material flow avoids all contact between the decorative and core materials and/or components so as to eliminate all potential opportunities for contamination until their introduction occurs at the last possible process step prior to lamination. However, the assumptions behind this laminate manufacturing model are outdated and do not take into consideration the advances made in the precision coating technology commonly available today as well as the invention described herein.

DESCRIPTION OF THE INVENTION

The present invention provides for a method and a process for the production of high pressure laminate using conventional manufacturing equipment without the use of melamine-formaldehyde resin pre-impregnated decorative print, solid, or overlay papers or combinations thereof. Herein, paper(s) without impregnating resin will be referred to as dry or non-treated. The laminate produced using this method and process utilize the assembly of a plurality of pre-impregnated Kraft papers independently saturated with melamine-formaldehyde resin, phenol-formaldehyde resin, and/or a bilayer coated construction of Kraft paper simultaneously containing both resins on opposing surfaces. The resulting pre-impregnated web based components are assembled into the core layer, where the number and basis weight of layers included is defined by the desired thickness required of the consolidated, finished laminate. The resulting core layer assembly is combined with the desired decorative layer assembly composed of dry decorative print, solid, and/or overlay papers, or combinations thereof, in such a way as to position the melamine-formaldehyde, pre-impregnated Kraft layer or layers adjacent to the dry decorative print, solid, or overlay papers or combinations thereof. The resulting assembly is placed in a press and subjected to conventional pressures and temperatures typically for the production of high pressure laminate and commonly known to those skilled in the art. This uniquely assembled configuration of pre-impregnated core and dry decorative layers creates a rheological potential that forces the melamine-formaldehyde resin into the dry decorative layer, wetting out the fiber contained within the decorative print, solid, or overlay papers or combinations thereof, sufficient to consolidate the decorative layer and Kraft core layer into a unitary structure with a completely contiguous surface layer of c-staged melamine-formaldehyde resin; the entirety of which is commonly referred to as high pressure decorative laminate.

The novel assembly of core and decorative layers described above and the resulting unique rheological potential created from such an assembly, has several benefits not realized by any other patented methods, processes, assemblies, or compositions previously described (FIGS. 5-8). One such unexpected benefit is related to the relative direction of resin flow, the velocity of which is sufficient to "carry" any abrasive materials, such as, but not limited to, aluminum oxide, previously imbedded into the overlay paper to the surface of the decorative layer in contact with the texturing media most commonly a metal plate or combination of a metal and texturing release film. This directional rheological potential results in more particles of abrasives being located proximate to the near surface of the resulting laminate and leads to higher abrasion resistance at lower abrasive material loading levels. Specific abrasive material formulations can result in better engineering of the scratch, scuff, mar, and bulk surface abrasion of the resulting laminate. Another unexpected benefit is related to the relative direction of resin flow, the velocity of which is sufficient to "carry" any abrasive materials, such as, but not limited to, aluminum oxide, embedded in decorative print paper to the surface of the decorative layer in contact with the texturing media most commonly a metal plate or combination of a metal and texturing release film.

Surprisingly, an additional benefit is related to the relative direction of resin flow, the velocity of which is sufficient to "carry" any abrasive materials, such as, but not limited to, aluminum oxide, embedded in decorative solid colored paper to the surface of the decorative layer in contact with the texturing media most commonly a metal plate or combination of a metal and texturing release film.

Another benefit of the unique rheological potential created by this invention method and product thereof is related to the relative direction of the resin flow, the velocity of which is sufficient to "carry" any abrasive materials, such as, but not limited to, aluminum oxide, distributed into melamine-formaldehyde resin and Kraft paper pre-impregnated with such resin, to the surface of the decorative layer in contact with the texturing media most commonly a metal plate or combination of a metal and texturing release film.

Another surprising benefit of the unique rheological potential created by this invention is the relative absence of void structures within the melamine surface layer. The uniformity of this surface coating and the relative absence of void formation enhance the moisture and chemical resistance as well as the fracture resistance and optical quality of the resulting laminate surface. A further benefit of the unique rheological potential created by this invention is the improved c-staged laminate release from the metal plate caused by the unexpected advance stage of the melamine-formaldehyde resin upon plate contact.

The resulting invention described herein represents a revolutionary shift in the conventional wisdom used to manufacture HPDL with an abrasion and chemically resistant, color fast, hard surface that is typically desired in high pressure laminate. However, this process can be applied to produce high pressure, low pressure and continuous pressure based lamination processes as well for any and all products typical to historical and current laminate applications. The example set forth below represents the general embodiments of the present invention and the methods and processes utilized for making said invention. However, this example is not intended to be limiting, as varying amounts of components, resins, additives, assemblies, types, and or thickness of said composition as well as variations in process timing may be required to produce laminate designed to meet the end use application.

BRIEF DESCRIPTION OF THE DRAWINGS

FIG. 1 is a schematic view of one preferred configuration order for arranging the paper plies between the release sheet and the steel plate for manufacturing the invention laminate.

FIG. 2 is a schematic view of a different preferred configuration order for arranging the paper plies between the release sheet and the steel plate for manufacturing the invention laminate.

FIG. 3 is a schematic view of a different preferred configuration order for arranging the paper plies between the release sheet and the steel plate for manufacturing the invention laminate.

FIG. 4 is a schematic view of a different preferred configuration order for arranging the paper plies between the release sheet and the steel plate for manufacturing the invention laminate.

FIG. 5 is a schematic view of a different preferred configuration order for arranging the paper plies between the release sheet and the steel plate for manufacturing the invention laminate.

FIG. 6 is a schematic view of a different preferred configuration order for arranging the paper plies between the release sheet and the steel plate for manufacturing the invention laminate.

FIG. 7 is a schematic view of a different preferred configuration order for arranging the paper plies between the release sheet and the steel plate for manufacturing the invention laminate.

FIG. 8 is a schematic view of a different preferred configuration order for arranging the paper plies between the release sheet and the steel plate for manufacturing the invention laminate.

FIG. 9 is a schematic view of a different preferred configuration order for arranging the paper plies between the release sheet and the steel plate for manufacturing the invention laminate.

FIG. 10 is a schematic view of a different preferred configuration order for arranging the paper plies between the release sheet and the steel plate for manufacturing the invention laminate.

DISCLOSURE OF PREFERRED CONDITIONS

Kraft paper of 245 gsm basis weight is impregnated with melamine-formaldehyde resin and dried in an oven heated to about 165° C. The resin content is approximately 55 wt % with a volatile content of approximately 10 wt % and a flow content of approximately 8 wt % and a resin solids content of approximately 60%. The resin wt % may range from 40 wt % to 70 wt %, the volatile wt % may range from 8 wt % to 12 wt %, the flow wt % may range from 5 wt % to 10 wt % and the resin solids may range is 20% to 70% depending on basis weight of decorative or overlay papers or combinations thereof used in laminate assembly. Examples of various assembly configurations, but not limited to those assemblies, are summarized in FIGS. 1-5. The melamine-formaldehyde resin may be catalyzed or un-catalyzed with catalysts common to those skilled in the art to achieve desired b- and c-staging of the components required for manufacturing as well as the finished product performance required for a particular application. The Kraft paper basis weight may range from 154 gsm to 380 gsm depending on the basis weights of the decorative, overlay or combinations thereof used in the laminate assembly. One key objective to this invention is the impregnated Kraft paper must contain a sufficient amount of melamine-formaldehyde resin or the like to penetrate and saturate the dry decorative print, solid overlay papers or combinations thereof used on the laminate surface. The wt % resin, volatiles and flow content for each layer mentioned are also key to this successful application of this invention for developing the requisite rheological potential during the high pressure and temperature assembly consolidation process. Using conventional laminate processing conditions, these components are assembled into the desired structure and consolidated using the temperature and pressure profiles familiar to those skilled in the art of laminate manufacturing. As discussed previously, the resin, volatile and flow contents described herein are sufficient to create the rheological potential required to force the melamine-formaldehyde resin into the dry decorative layer, wetting out the fiber contained within the decorative print, solid, or overlay papers or combinations thereof, sufficient to consolidate the decorative layer and Kraft core layer into a unitary structure with a completely contiguous surface layer of c-staged melamine-formaldehyde resin; the entirety of which is commonly referred to as high pressure decorative laminate with the unexpected benefits described above.

EXAMPLE

A laminate prepared according to the invention disclosure was tested per the National Electrical Manufactures Association (NEMA).
Test Method Parameters and Conditions:
Nema Test Method 3.5—High Temperature Water Resistance
The oil is heated to 100 C-110 C and placed on the surface of the laminate for 20 min.
Nema Test Method 3.13—Wear Resistance 180 grit sand paper is utilized and 375-425 laminate surface wear cycles is achieved
Nema Test Method 3.1—Formability
The Radiant heat bar is set at a temperature of 135 C-190 C and the laminate postforms to a face bend radius of ¼"-½" and a back bend radius of ¼"-⅝"
Nema Test Method 3.15—Blister Resistance
The Radiant heat bar is set at a temperature of 149 C-205 C and the laminate blister time is 40-55 sec.
*Note
All test samples are conditioned for 48 hours at a temperature of 23 C and 50% relative humidity.

TABLE

National Electrical Manufacturers Association (NEMA) Laminate Testing Performance Properties Specifications

| | | Grade | General Purpose | | Post-Forming | |
|---|---|---|---|---|---|---|
| | Property | Units | HGL | VGS | HGP | VGP |
| LD 3 Test Method | Nominal Thickness | mm (inch) | 1.0 0.039 | 0.7 0.028 | 1.0 0.039 | 0.7 0.028 |
| 3.6 | High Temp Water Resistance | Rating* Min | Slight effect | Slight effect | Slight effect | Slight effect |
| 3.13 | Wear Resistance | Cycles | 400 | 400 | 400 | 400 |
| 3.14 | Formability | mm (inch) Radius | — | — | 16 (⅝) | 13 (½) |
| 3.15 | Blister Resistance | Sec | 55 | 40 | 55 | 40 |

The test performance properties and specifications in the table were set by NEMA for high pressure laminate. Laminate produced using the described invention herein met or exceeded NEMA properties for high pressure laminate.

In addition to the above disclosed invention process and product, the following objectives are also envisioned:

(1) A high pressure decorative laminate produced by utilizing Kraft paper impregnated with melamine-formaldehyde resin on one side and phenol-formaldehyde resin on the other side and dry overlay papers where the basis weight of the overlay is in the range of 5 66 gsm, preferably 5-29 gsm, (2) A high pressure decorative laminate produced by utilizing melamine-formaldehyde resin impregnated Kraft paper and dry print decorative, dry solid decorative and dry overlay papers or combinations thereof;

(3) A high pressure decorative laminate produced by utilizing melamine-formaldehyde resin pre-impregnated Kraft paper as the only resin carrier;

(4) A high pressure decorative laminate produced to improve release characteristics of the high pressure laminate surface from metal plates by using melamine-formaldehyde impregnated Kraft as the resin carrier;

(5) A high pressure decorative laminate produced to improve optical clarity of the laminate by using melamine-formaldehyde impregnated Kraft as the resin carrier;

(6) A high pressure decorative laminate produced to improve laminate surface abrasion characteristics by using melamine-formaldehyde impregnated Kraft as the resin carrier;

(7) A high pressure decorative laminate process to produce high pressure, low pressure, continuous pressure decorative laminates using melamine-formaldehyde impregnated Kraft as the resin carrier;

(8) A process to produce decorative laminate by utilizing melamine-formaldehyde resin impregnated Kraft paper and melamine-formaldehyde resin pre-impregnated overlay papers where the basis weight of the overlay is in the range of 5-66 gsm, preferably 5-29 gsm and the resin content is in the range of 10-70 wt %, preferably 20-35 wt % and the volatile content is 4-6 wt %, preferably 4.5-5.5 wt %;

(9) A process to produce decorative laminate by utilizing Kraft paper impregnated with melamine-formaldehyde resin on one side and phenol-formaldehyde resin on the other side and melamine-formaldehyde resin pre-impregnated overlay papers where the basis weight of the overlay is in the range of 5-66 gsm, preferably 5-29 gsm and the resin content is in the range of 10-70 wt %, preferably 20-35 wt % and the volatile content is 4-6 wt %, preferably 4.5-5.5 wt %;

(10) A process to produce decorative laminate by utilizing melamine-formaldehyde resin impregnated Kraft paper and melamine-formaldehyde resin pre-impregnated solid color decorative paper where the basis weight of the solid color decorative paper is in the range of 48-158 gsm, preferably 48-100 gsm and the resin content is in the range of 10-70 wt %, preferably 20-35 wt % and the volatile content is 4-6 wt %, preferably 4.5-5.5 wt %;

(11) A process to produce decorative laminate by utilizing Kraft paper impregnated with melamine-formaldehyde resin on one side and phenol-formaldehyde resin on the other side and melamine-formaldehyde resin pre-impregnated solid color decorative paper where the basis weight of the solid color decorative paper is in the range of 48-158 gsm, preferably 48-100 gsm and the resin content is in the range of 10-70 wt %, preferably 20-35 wt % and the volatile content is 4-6 wt %, preferably 4.5-5.5 wt %;

(12) A process to produce decorative laminate by utilizing melamine-formaldehyde resin impregnated Kraft paper and melamine-formaldehyde resin pre-impregnated decorative print paper where the basis weight of the decorative print paper is in the range of 48-158 gsm, preferably 48-100 gsm and the resin content is in the range of 10-70 wt %, preferably 20-35 wt % and the volatile content is 4-6 wt %, preferably 4.5-5.5 wt %;

(13) A process to produce decorative laminate by utilizing Kraft paper impregnated with melamine-formaldehyde resin on one side and phenol-formaldehyde resin on the other side and melamine-formaldehyde resin pre-impregnated decorative print paper where the basis weight of the decorative print paper is in the range of 48-158 gsm, preferably 48-100 gsm and the resin content is in the range of 10-70 wt %, preferably 20-35 wt % and the volatile content is 4-6 wt %, preferably 4.5-5.5 wt %;

(14) A process to produce decorative laminate where abrasive particles, including but not limited to aluminum oxide, are added to the overlay during the impregnation process;

(15) A process to produce decorative laminate where abrasive particles, including but not limited to aluminum oxide, are added to the solid color decorative paper during the impregnation process;

(16) A process to produce decorative laminate where abrasive particles, including but not limited to aluminum oxide, are added to the decorative print paper during the impregnation process;

(17) A process to produce decorative laminate where abrasive particles, including but not limited to aluminum oxide, are distributed into melamine-formaldehyde resin and Kraft paper pre-impregnated with such resin; and

(18) A process to produce decorative laminate where a plurality of abrasive particle sizes are utilized.

While the present general inventive concept has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

It is also noted that numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. An improved process for the production of high pressure laminate using conventional manufacturing equipment comprising the steps of:
    (a) Pre-impregnation of kraft paper with phenol formaldehyde resin;
    (b) Pre-impregnation of decorative, solid, print, and overlay papers with melamine formaldehyde resin;
    (c) Collating these pre-impregnated papers into a laminate assembly; and
    (d) Treating the laminate assembly in a high pressure press to form a consolidated mass,
    wherein the improvement resides in modifying step (a) in pre-impregnating at least the top-most (closest to the decorative surface) sheet of kraft paper with melamine formaldehyde resin and eliminating the step (b) pre-impregnation of the decorative solid, print, and overlay papers with melamine formaldehyde resin ahead of steps (c) and (d) and wherein the step (a) pre-impregnation includes an amount of melamine formaldehyde resin sufficient to create the rheological potential required to penetrate the dry (non pre-impregnated) decorative print, solid color and overlay papers or combinations thereof sufficient to consolidate into a unitary structure with a completely contiguous surface when exposed to heat and pressure during the pressing process.

2. The process of claim 1 further including the addition of at least one bilayer coated construction of kraft paper defined as simultaneously containing melamine-formaldehyde resin and phenol-formaldehyde resin on opposing surfaces, whereas the melamine side of the kraft is placed next to the decorative paper to create the rheological potential required to penetrate the dry (non pre-impregnated) decorative print, solid color and overlay papers or combinations thereof sufficient to consolidate into a unitary structure with a completely contiguous surface when exposed to heat and pressure during the pressing process.

3. The process of claim 1 wherein the melamine-formaldehyde resin content of the top-most layer of kraft paper is in the range of 40-70% wt. verses the prior art of about 30% wt of phenol-formaldehyde resin (this lined-through information should be in the text of the application (Detailed description of the disclosure).

4. The process of claim 1 wherein the melamine-formaldehyde resin content of the top-most layer of kraft paper is in the range of 47-55% wt.

5. The process of claim 2 wherein the combined melamine-formaldehyde/phenol-formaldehyde resin content of the top-most layer of kraft paper is in the range of 40-70% wt.

6. The process of claim 1 wherein the melamine/formaldehyde resin content of the topmost layer of kraft paper is in the range of 47-55% wt.

7. The process of claim 1 wherein the top-most layer of melamine-formaldehyde resin of the impregnated kraft paper has a volatile content in the range of 8-12% wt.

8. The process of claim 2 wherein the melamine formaldehyde/phenol-formaldehyde bilayer impregnated top-most layer of kraft paper has a volatile content in the range of 8-12% wt.

9. The process of claim 1 wherein the top most layer of melamine formaldehyde resin of the impregnated kraft paper has a volatile content in the range of 9-10% wt.

10. The process of claim 2 wherein the melamine formaldehyde/phenol-formaldehyde bilayer impregnated top most layer of kraft paper has a volatile content in the range of 9-10% wt.

11. The process of claim 1 wherein the top-most layer of melamine formaldehyde resin of the impregnated kraft paper has a flow content in the range of 5-10% wt.

12. The process of claim 2 wherein the melamine formaldehyde/phenol-formaldehyde bilayer impregnated top-most layer of kraft paper has flow content in the range of 5-10% wt.

13. The process of claim 1 wherein the top-most layer of melamine formaldehyde resin of the impregnated kraft paper has a flow content in the range of 7-9% wt.

14. The process of claim 2 wherein the melamine formaldehyde/phenol-formaldehyde bilayer impregnated top-most layer of kraft paper has flow content in the range of 7-9% wt.

15. The process of claim 1 wherein the basis weight of the dry decorative print papers is in the range of 48-154 gsm.

16. The process of claim 1 wherein the basis weight of the dry decorative print papers is in the range of 45-90 gsm.

17. The process of claim 2 wherein the basis weight of the dry print paper is in the range of 48-154 gsm.

18. The process of claim 2 wherein the basis weight of the dry print paper is in the range of 45-90 gsm.

19. The process of claim 1 wherein the basis weight of the dry solid paper is in the range of 48-154 gsm.

20. The process of claim 1 wherein the basis weight of the dry solid paper is in the range of 73-129 gsm.

21. The process of claim 2 wherein the basis weight of the dry solid paper is in the range of 48-154 gsm.

22. The process of claim 2 wherein the basis weight of the dry solid paper is in the range of 73-129 gsm.

23. The process of claim 1 wherein the basis weight of the dry overlay is in the range of 5-66 gsm.

24. The process of claim 1 wherein the basis weight of the dry overlay is in the range of 5-29 gsm.

25. The process of claim 2 wherein the basis weight of the dry overlay is in the range of 5-66 gsm.

26. The process of claim 2 wherein the basis weight of the dry overlay is in the range of 5-29 gsm.

27. The laminate product of the process of claim 1 exhibiting improved release characteristics of the high pressure laminate surface from metal plates during the pressing cycle.

28. The laminate product of the process of claim 2 exhibiting improved release characteristics of the high pressure laminate surface from metal plates during the pressing cycle.

29. The laminate product of the process of claim 1 exhibiting improved optical clarity of the laminate.

30. The laminate product of the process of claim 2 exhibiting improved optical clarity of the laminate.

31. The laminate product of the process of claim 1 exhibiting improved laminate surface abrasion characteristics.

32. The laminate product of the process of claim 2 exhibiting improved laminate surface abrasion characteristics.

33. The laminate product of the process of claim 1 exhibiting improved high pressure, low pressure, and continuous pressure decorative laminates.

34. The laminate product of the process of claim 2 exhibiting improved high pressure, low pressure, and continuous pressure decorative laminates.

\* \* \* \* \*